United States Patent
Kotwicki et al.

(10) Patent No.: US 6,321,732 B1
(45) Date of Patent: Nov. 27, 2001

(54) AIR FLOW AND EGR FLOW ESTIMATION

(75) Inventors: Allan Joseph Kotwicki, Williamsburg; Freeman Carter Gates, Bloomfield; John David Russell, Farmington Hills, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/517,201

(22) Filed: Mar. 2, 2000

Related U.S. Application Data

(63) Continuation-in-part of application No. 09/226,681, filed on Jan. 11, 1999.

(51) Int. Cl.$^7$ .................................................. F02M 25/07
(52) U.S. Cl. ................... 123/568.16; 123/568.21; 73/117.3
(58) Field of Search .................... 123/568.11, 568.12, 123/568.16, 568.21, 568.26, 568.27; 73/117.3, 118.1, 118.2, 861.52; 701/108

(56) References Cited

U.S. PATENT DOCUMENTS

| | | | |
|---|---|---|---|
| 4,290,404 | 9/1981 | Hata et al. | 123/478 |
| 4,390,001 | 6/1983 | Fugimoto | 123/568.2 |
| 4,406,161 | 9/1983 | Locke et al. | 73/118.1 |
| 4,562,744 | 1/1986 | Hall et al. | 73/861.52 |
| 4,690,120 | 9/1987 | Egle . | |
| 5,086,655 | 2/1992 | Fredericks et al. . | |
| 5,188,086 | 2/1993 | Adkins et al. . | |
| 5,190,017 | 3/1993 | Cullen et al. . | |
| 5,203,313 | 4/1993 | Rotarius . | |
| 5,205,260 | 4/1993 | Takahashi et al. . | |
| 5,273,019 | 12/1993 | Matthews et al. . | |
| 5,331,936 | 7/1994 | Messih et al. . | |
| 5,347,843 | 9/1994 | Orr et al. | 73/1.34 |
| 5,461,932 | 10/1995 | Hall et al. . | |
| 5,465,617 | 11/1995 | Dudek et al. | 73/118.2 |
| 5,537,977 | 7/1996 | Hartman et al. | 123/406.46 |
| 5,546,795 | 8/1996 | Yamagishi | 73/118.2 |
| 5,585,553 | 12/1996 | Schricker | 73/117.3 |
| 5,613,479 | 3/1997 | Gates et al. | 123/568.27 |
| 5,714,683 | 2/1998 | Maloney . | |
| 5,753,805 | 5/1998 | Maloney . | |
| 5,988,149 | 11/1999 | Gates | 123/568.21 |
| 6,109,249 | * 8/2000 | Wild et al. | 123/568.21 |
| 6,125,830 | * 10/2000 | Kotwicki et al. | 123/568.21 |
| 6,170,475 | * 1/2001 | Lewis et al. | 123/568.21 |

FOREIGN PATENT DOCUMENTS 10-53032   3/1989   (JP) .

OTHER PUBLICATIONS

"Experimental Methods for Engineers" J.P. Holman, pp. 184–236, Second Edicition, McGraw–Hill Book Company, No Date Given.

"The Internal–Combustion Engine in Theory and Practice", vol. I: Thermodynamics, Fluid Flow, Performance, Second Edition, Revised, The MIT Press, by C. f. Taylor (No Date Given).

* cited by examiner

*Primary Examiner*—Willis R. Wolfe
(74) *Attorney, Agent, or Firm*—John D. Russell; Allan J. Lippa

(57) ABSTRACT

An exhaust gas recirculation systems directs exhaust gasses from an exhaust manifold to an intake manifold of an internal combustion engine. The exhaust gasses travel from the exhaust manifold, first passing through a flow control valve and then through a measuring orifice before entering the intake manifold. Pressure difference across the orifice is used, along with correction factors based on the pressure difference and pressure downstream of the orifice, to measure and control exhaust gas flow. Further, manifold pressure is determined from downstream pressure and the used along with the measured exhaust gas flow to calculated a cylinder air charge amount.

13 Claims, 4 Drawing Sheets

AIR FLOW AND EGR FLOW ESTIMATION

This application is a continuation-in-part of U.S. patent application Ser. No. 09/226,681, filed Jan. 11, 1999.

FIELD OF THE INVENTION

The present invention relates to a system and method to measure and control exhaust gas recirculation flow and estimate cylinder air charge for air-fuel ratio control.

BACKGROUND OF THE INVENTION

Many methods are available to estimate cylinder air charge using a manifold pressure sensor. Typically, engine maps are provided that provide a cylinder air charge as a function of measured manifold pressure, manifold temperature, and engine speed. In engines that also utilize exhaust gas recirculation, an improved cylinder air charge estimate is obtained by providing adjustments based on the amount of exhaust gas recirculation.

One particular method is described in U.S. Pat. No. 5,205,260. In this method, an EGR flow is estimated based on differential pressure across a flow control valve and based on a cross-sectional area of the valve. Then, this flow is used in a manifold filling model to estimate a partial pressure of EGR in the intake manifold. Then, based on this partial pressure of EGR and measured manifold pressure, a cylinder air charge value is computed.

The inventors herein have recognized a disadvantage with the above system. In particular, estimating EGR flow in this manner leads to estimation inaccuracies. Since inaccuracies in EGR flow directly affect estimated cylinder air charge, this leads to inaccuracies in calculated fuel injection amount and therefore may degrade air-fuel ratio control.

SUMMARY OF THE INVENTION

An object of the invention claimed herein is to provide an exhaust gas recirculation measurement system and cylinder air charge estimation system with improve accuracy. The above object is achieved, and problems of prior approaches overcome, by a system for estimating engine flows, including exhaust gas flow from an exhaust manifold of an internal combustion engine to an intake manifold of the engine, the system comprising: a flow control valve having a variable orifice positioned in an exhaust gas recirculation path between the exhaust manifold and intake manifold of the engine; a fixed orifice area located in said path and downstream of said valve; and a computer for measuring a first pressure downstream of said measuring orifice, measuring a differential pressure across said measuring orifice, calculating a recirculated exhaust flow based on said first pressure and said differential pressure, and determining a cylinder air amount based on said first pressure and said calculated recirculated exhaust flow.

By using common signals for estimating EGR flow and cylinder air charge, a simplified structure and reduced cost system is obtained. Further, by using a fixed orifice area downstream of a control valve to recirculate exhaust gas along with a differential pressure measurement and a downstream pressure measurement, a more accurate EGR flow estimate is obtained. In particular, the estimation scheme does not have to account for the changing valve area, and thus less affects have to be included. Further yet, the present invention does not need to measure or infer exhaust manifold temperature or exhaust manifold pressure.

An advantage of the above aspect of the invention is that more accurate cylinder air charge estimate is obtained.

Another advantage of the above aspect of the invention is that the more accurate cylinder air estimate yields improved emissions at a reduced system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

The present application incorporates by reference the parent application U.S. Ser. No. 09/266681, filed Jan. 11, 1999, which is assigned to the same assignee as the present application.

Figure 1:
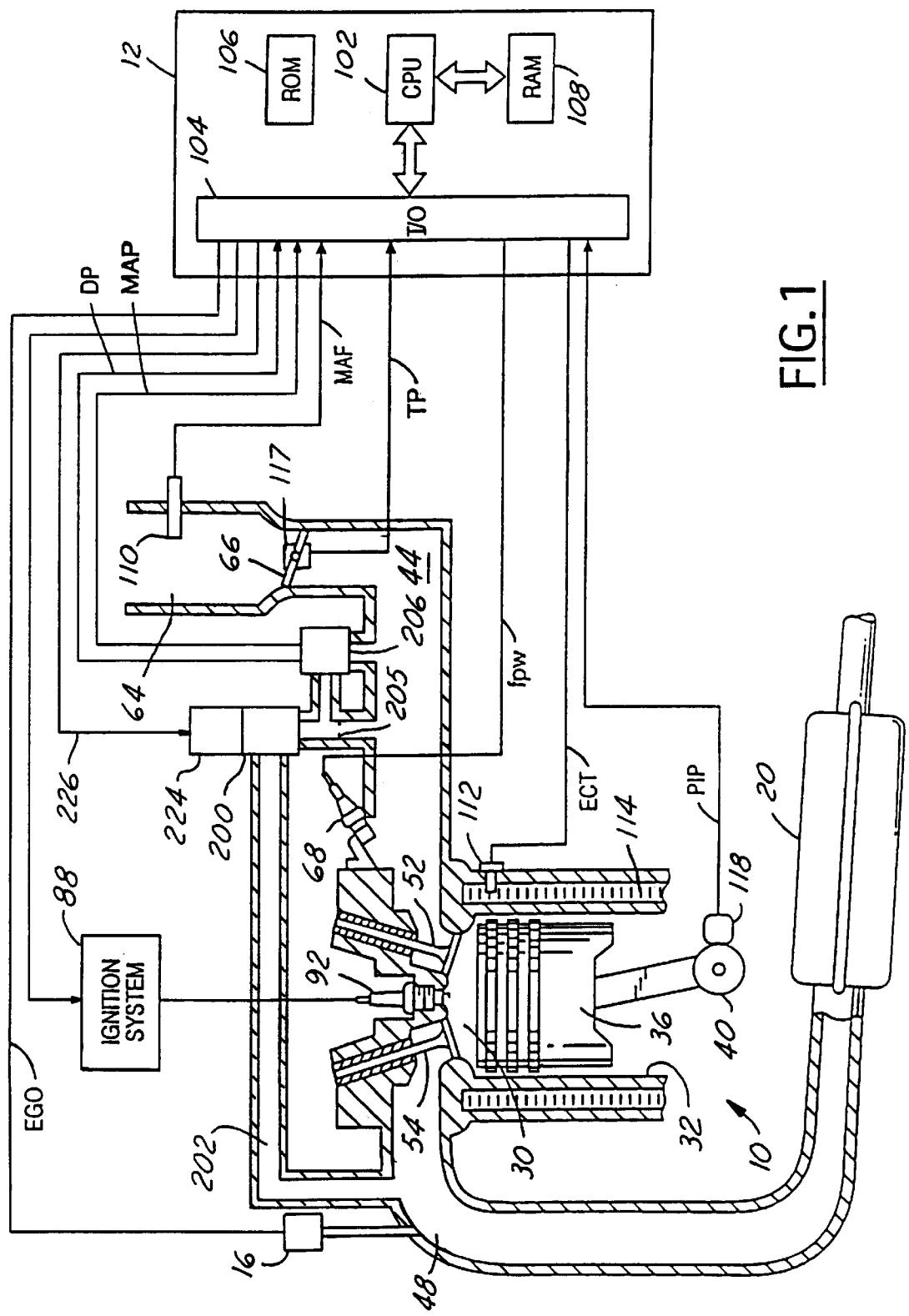
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Exhaust gas is delivered to intake manifold 44 by a conventional EGR tube 202 communicating with exhaust manifold 48, EGR valve assembly 200, and EGR orifice 205. Alternatively, tube 202 could be a internally routed passage in the engine that communicates between exhaust manifold 48 and intake manifold 44. Flow Sensor 206 communicates with EGR tube 202 between valve assembly 200 and orifice 205. Flow sensor 206 also communicates with intake manifold 44. Stated another way, exhaust gas travels from exhaust manifold 48 first through valve assembly 200, then through EGR orifice 205, to intake manifold 44. EGR valve assembly 200 can then be said to be located upstream of orifice 205.

Flow sensor 206 provides a measurement of manifold pressure (MAP) and pressure drop across orifice 205 (DP) to controller 12. Signals MAP and DP are then used to calculated EGR flow as described later herein with particular reference to FIGS. 3–5. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, as is obvious to those skilled in the art, any type of flow control valve may be used, such as, for example, an electrical solenoid powered valve or a stepper motor powered valve.

Figure 2A:
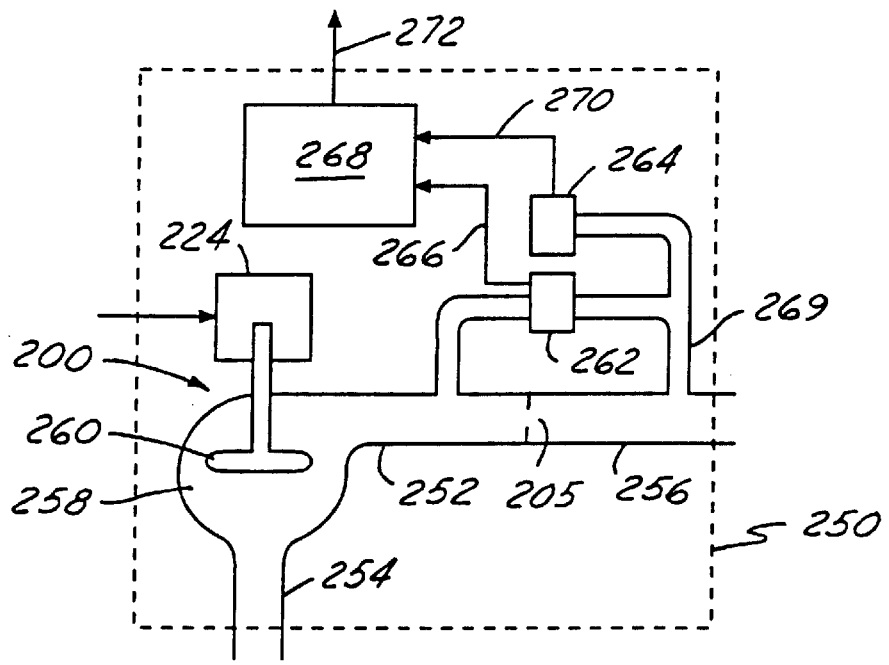
FIGS. 2A and 2B are alternate embodiments of the present invention.
Figure 2B:
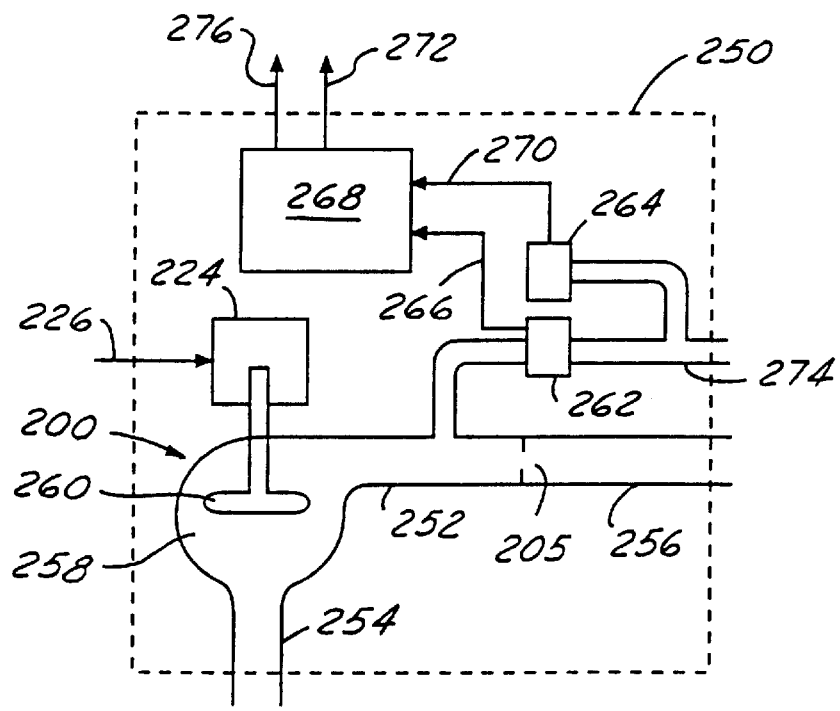

Referring now to FIGS. 2A and 2B, and in particular to FIG. 2A, an alternative embodiment of the present invention is shown in which housing 250 contains path 252 with inlet end 254 and outlet end 256. Variable orifice 258 is controlled by pintle 260 of valve 200. Housing 250 also holds vacuum regulator 224 which is coupled to valve 200 and thereby regulates pintle 260. Path 252 also has orifice 205 coupled to outlet end 256. Differential pressure sensor 262 measures pressure difference across orifice 205 and provides differential pressure signal 266 to circuit 268. Pressure sensor 264 measures communicates via measurement path 269 with outlet end 256 and measure pressure downstream of orifice 205 and provides pressure signal 270 to circuit 268. Circuit 268 calculates, either digitally using microprocessor circuits known to those skilled in the art or using analog circuits known to those skilled in the art, the product of signals 266 and 270. Circuit 268 then makes the result of this calculation available in signal 272.

Alternatively, as shown in FIG. 2B, differential sensor 262 and sensor 264 communicate with downstream flow (not shown) via second communication path 274. In this embodiment, paths 256 and 274 are adapted to be connected to an intake manifold of an internal combustion. Then, path 274 and 256 will be in fluid communication via the intake manifold. Such an arrangement is preferable if circuit 268 also provide signal 276 representing the pressure measured by sensor 264.

Figure 3:
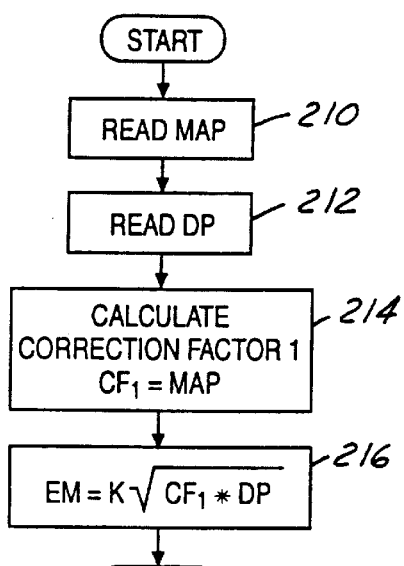
FIGS. 3–6 are a high level flowcharts of various routines for controlling EGR flow.

Referring now to FIG. 3, a routine for calculating EGR flow (EM) is described. In step 210, the signal MAP is read by controller 12 from sensor 206, giving a measure of pressure downstream of orifice 205. Then, in step 212, the differential pressure, DP, across orifice 205 is read by controller 12 from sensor 206. In step 214, a correction factor, CF1, partially accounting for the compressibility effects of the EGR flow is calculated as the absolute pressure measured by signal MAP. Alternatively, if the downstream pressure measured in step 210 was pressure relative to atmosphere, correction factor CF1 would be calculated as the sum of the pressure relative to atmosphere plus the absolute pressure due to the atmosphere. Then, in step 216, EGR flow, EM, is calculated as the square root of the product of correction factor CF1, differential pressure DP, and constant K Constant K represents a calibration term that accounts for various unit conversions and the area of orifice 205. In this way, pressure and temperature effects due to the expansion of the EGR flow through valve 200 are sufficiently removed and measurement error is reduced.

The routine described in FIG. 3 exploits the nature of the flow due to expansion first through flow control valve 200 and then through orifice 205, where the source of flow is exhaust manifold 48 and the sink is intake manifold 44 of internal combustion engine 10. Due to the typical ranges of exhaust manifold pressure and temperature and intake manifold pressure (MAP), EGR flow may be approximated using the product of pressure difference (DP) across orifice 205 and pressure downstream (MAP) of orifice 205 without need for measuring temperature upstream of orifice 205 (downstream of flow control valve 200).

Figure 4:
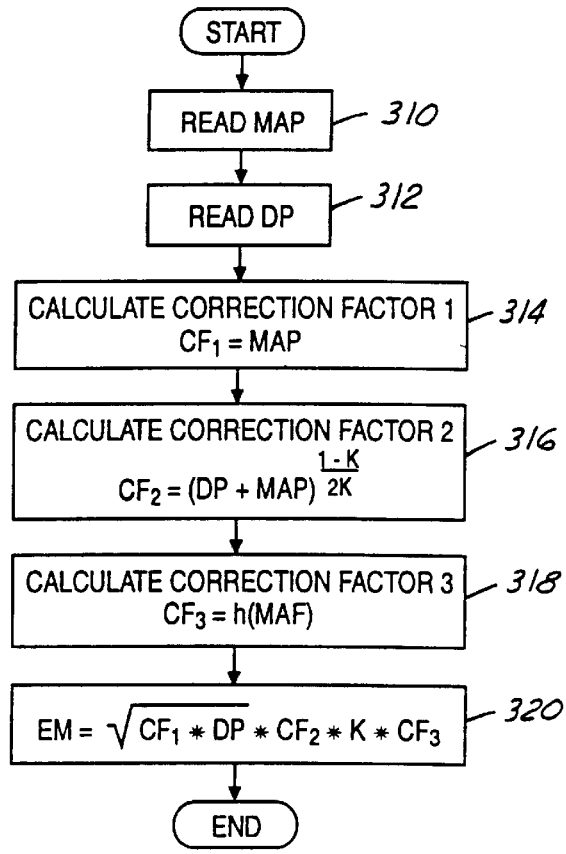

Referring now to FIG. 4, an alternate routine for calculating EGR flow (EM) is described. In step 310, the signal MAP is read by controller 12 from sensor 206, giving a measure of pressure downstream of orifice 205. Then, in step 312, the differential pressure, DP, across orifice 205 is read by controller 12 from sensor 206. In step 314, a correction factor, CF1, partially accounting for the compressibility effects of the EGR flow is calculated as the absolute pressure measured by signal MAP. Alternatively, if the downstream pressure measured in step 310 was pressure relative to atmosphere, correction factor CF1 would be calculated as the sum of the pressure relative to atmosphere plus the absolute pressure due to the atmosphere. Then, in step 316, correction factor CF2 is calculated as a function of both differential pressure DP and downstream pressure MAP, where k represents the ratio of specific heats of exhaust gas. Correction factor CF2 further accounts for the compressibility effects of the EGR flow. Then, in step 318, correction factor CF3 is calculated as a function of flow through the engine, MAF. Correction factor CF3 accounts for variations in exhaust pressure. Function h represents a function relating airflow through the engine (MAF) to exhaust pressure and is determined experimentally. Additionally, function h can include a correction for barometric pressure. In other words, the exhaust pressure is calculated as a function of both MAF and barometric pressure. The effect of barometric pressure on exhaust pressure is also determined experimentally. Barometric pressure can be either measured or estimated using methods known to those skilled in the art. Then, in step 320, EGR flow, EM, is calculated as a function of correction factors CF1, CF2, CF3, differential pressure DP and constant K. In this way, pressure and temperature effects due to the expansion of the EGR flow through valve 200 are further removed and measurement error is further reduced with additional complexity.

Figure 5:
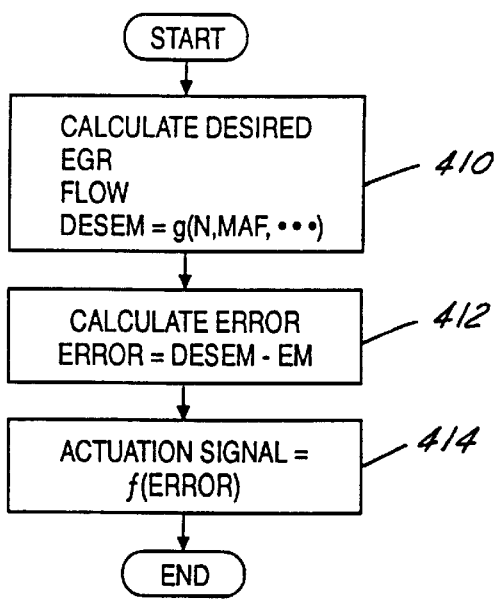

Referring now to FIG. 5, a routine for controlling EGR flow is described. In step 410, the desired EGR flow, DESEM, is calculated as a function of engine operating conditions that include engine speed (determined from signal PIP) and airflow (MAF). Then, the value of EM calculated according to either FIG. 3 or 4 is subtracted from DESEM to create an error signal, ERROR. Then, in step 414, actuation signal 226 is calculated as a function (f) of signal ERROR. In a preferred embodiment, function (f) represents a PID controller. Alternatively, function (f) may represent any type of feedback or feedforward controller known to those skilled in the art.

Figure 6:
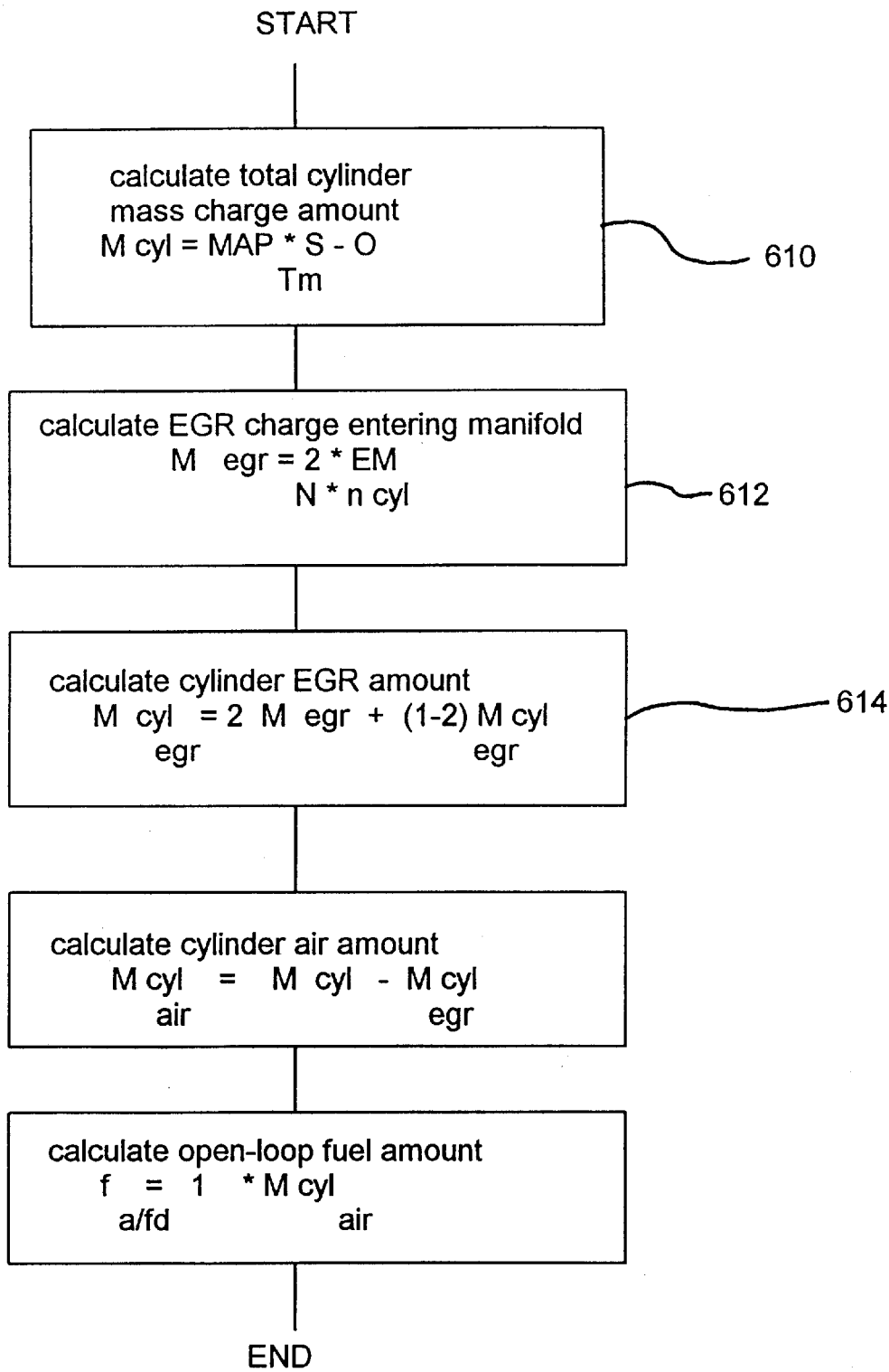

Referring now to FIG. 6, a routine for calculating cylinder air charge. The routine is executed once per engine firing. In other words, the routine is executed synchronously with engine firing events. First, in step 610, total cylinder mass charge (which is the sum of cylinder air amount and cylinder exhaust gas recirculation amount) is determined based on manifold pressure and manifold temperature. In a preferred embodiment, the following equation is used where slope (s) and offset (o) are determined as a function of engine speed.

$$m_{cyl} = \frac{MAP * s - o}{T_m}$$

Next, in step 612, EGR flow EM divided by engine speed (N) and number of cylinders ($n_{cyl}$) is determined.

$$\overline{m}_{egr} = \frac{2 * EM}{N * n_{cyl}}$$

Then, in step 614, cylinder exhaust gas recirculation amount is determined by filtering $\overline{m}_{egr}$. In particular, according to the present invention, the value is filtered synchronously with engine firing events. The filter coefficient ($\alpha$) is a function of engine speed. The following equation shows the filtering method.

$$m_{cyl_{egr}} = \alpha \overline{m}_{egr} + (1-\alpha) m_{cyl_{egr}}$$

Using the embodiment of FIG. 3, this can be rewritten as:

$$m_{cyl_{egr}} = \alpha \frac{2K\sqrt{MAP*DP}}{n_{cyl}N} + (1-\alpha)m_{cyl_{egr}}$$

Next, in step 616, cylinder air amount is determined by subtracting the cylinder exhaust gas recirculation amount from the total cylinder amount as shown below.

$$m_{cyl_{air}} = m_{cyl} - m_{cyl_{egr}}$$

Then, this value is used to calculate (open-loop) fuel injection amount (f) based on desired air-fuel ratio (a/fd). Also, fuel injection amount (f) can be adjusted based on a measured exhaust gas oxygen concentration from a HEGO sensor using methods known to those skilled in the art to provide closed loop air-fuel ratio control.

$$f = \frac{1}{a/f_d} m_{cyl_{air}}$$

Thus, according to the present invention, it is possible to use the improved EGR flow estimation provided by having a downstream orifice and an upstream valve wherein differential pressure across the downstream orifice and manifold pressure provide the EGR flow estimate. Further, this improved EGR flow estimate is then filtered to account for manifold dynamics and used to calculate an improved cylinder air amount. Then, this improved cylinder air amount is used in air-fuel ratio control.

This concludes the description of the Preferred Embodiment. The reading of it by those skilled in the art would bring to mind many alterations and modifications without departing from the spirit and scope of the invention. For example, rather than a differential pressure sensor and an absolute downstream pressure sensor, two absolute pressure sensors (one upstream of the fixed area orifice ($p_1$) and one downstream of the fixed area orifice ($p_2$)) could be used. From the two absolute pressure sensors, a differential pressure signal and a downstream pressure signal could be produced. In other words, manifold pressure could be provided from the downstream pressure sensor and the differential pressure could be provided from the difference between the upstream and downstream pressure sensors. The difference could be calculated internally in the microprocessor or in an analog circuit coupled to the two pressure sensors. In other words, the equation of step 216 would become:

$$EM = K\sqrt{(p_1 - p_2) * p_2}$$

Accordingly, it is intended that the scope of the invention be defined by the following claims.

We claim:

1. A system for estimating engine flows, including exhaust gas flow from an exhaust manifold of an internal combustion engine to an intake manifold of the engine, the system comprising:

a flow control valve having a variable orifice positioned in an exhaust gas recirculation path between the exhaust manifold and intake manifold of the engine;

a fixed orifice area located in said path and downstream of said valve;

a differential pressure sensor for providing a differential pressure;

an absolute pressure center for providing a first pressure; and a computer for measuring said first pressure downstream of said fixed orifice area, measuring said differential pressure across said fixed orifice area, calculating a recirculated exhaust flow based on a square root of a product of said first pressure and said differential pressure, determining a cylinder air amount based on said first pressure and said calculated recirculated exhaust flow, and calculating a fuel injection amount based on said cylinder air amount.

2. A system for estimating engine flows including exhaust gas flow from the exhaust manifold of an internal combustion engine to an intake manifold of the engine, the system comprising:

a flow control valve having a variable orifice position and an exhaust gas recirculation path between the exhaust manifold and intake manifold of the engine;

a fixed orifice area located in said path and downstream of said valve;

an exhaust gas sensor coupled to the exhaust manifold; and a computer for measuring a first pressure downstream of said fixed orifice area, measuring a differential pressure across said fixed orifice area, calculating a recirculated exhaust flow based on said first pressure and said differential pressure, determining an air amount entering a cylinder of the engine based on said first pressure and said calculated recirculated exhaust flow, and calculating a fuel injection amount based on said air amount and an output of the sensor.

3. A method for estimating engine flows, including flow from an engine exhaust to and engine intake wherein the flow passes through a flow control valve and then a fixed area measuring orifice, the method comprising;

measuring a pressure difference across the measuring orifice;

measuring a pressure downstream of the measuring orifice representative of manifold pressure;

calculating a recirculated exhaust flow based on said downstream pressure and said differential pressure;

determining a cylinder recirculated exhaust gas amount by filtering said recirculated exhaust flow; and determining a cylinder air amount based on said cylinder recirculated exhaust gas amount and said downstream pressure.

4. The method recited in claim 3 wherein said step of calculating a recirculated exhaust flow further comprises calculating said recirculated exhaust flow based on a product of said downstream pressure and said differential pressure.

5. The method recited in claim 3 wherein said step of calculating a recirculated exhaust flow further comprises calculating said recirculated exhaust flow based on a square root of said product of said downstream pressure and said differential pressure.

6. The method recited in claim 3 wherein said filtering is performed synchronously with engine firing events.

7. The method recited in claim 6 wherein a filtering coefficient of said filtering is based on engine speed.

8. A system for estimating engine flows, including exhaust gas flow from an exhaust manifold or internal combustion engine to an intake manifold of the engine, and the system comprising:

a flow control valve having a variable orifice positioned in an exhaust gas recirculation path between the exhaust manifold and intake manifold of the engine;

a fixed orifice area located in said path and downstream of said valve; and a computer for measuring a first pressure downstream of said fixed orifice area, measuring a differential pressure across said fixed orifice area, determining an actual amount of a recirculated exhaust flow based on said first pressure and said differential pressure, and calculating an air amount entering a cylinder of the engine based on said first pressure and said actual amount of recirculated exhaust flow.

9. The system recited in claim 8 wherein said computer further calculates a fuel injection amount based on said air amount.

10. The system recited in claim 8 further comprising a catalyst coupled to the exhaust manifold of the engine.

11. The system recited in claim 8 further comprising an exhaust gas sensor coupled to the exhaust manifold of the engine.

12. The system recited in claim 11 wherein said computer further calculates a fuel injection amount based on said air amount and an output of said exhaust gas sensor.

13. The system recited in claim 12 wherein said exhaust gas sensor is an exhaust gas oxygen sensor.

* * * * *